United States Patent [19]

Matsui

[11] Patent Number: 4,896,504
[45] Date of Patent: Jan. 30, 1990

[54] EXHAUST GAS CONTROL DEVICE FOR ENGINES

[75] Inventor: Sachio Matsui, Iwata, Japan

[73] Assignee: Yamaha Matsudoki Kabushiki Kaisha, Iwata, Japan

[21] Appl. No.: 126,839

[22] Filed: Nov. 30, 1987

[30] Foreign Application Priority Data

| Dec. 3, 1986 [JP] | Japan | 61-288480 |
| Dec. 3, 1986 [JP] | Japan | 61-288481 |
| Dec. 3, 1986 [JP] | Japan | 61-288482 |
| Mar. 2, 1987 [JP] | Japan | 62-45292 |

[51] Int. Cl.$^4$ .............................................. F02B 27/02
[52] U.S. Cl. .................................... 60/313; 180/89.2; 180/219
[58] Field of Search ................... 60/312, 313; 180/219, 180/296, 89.2

[56] References Cited

U.S. PATENT DOCUMENTS

| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach et al. . |
| 3,523,418 | 8/1970 | Marsee . |
| 3,751,921 | 8/1973 | Blomberg . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,254,752 | 3/1981 | Friddell et al. . |
| 4,327,811 | 9/1982 | Isaka ....................................... 60/313 |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| 51-54118 | 5/1976 | Japan . |
| 231156 | 3/1925 | United Kingdom . |
| 262044 | 6/1926 | United Kingdom . |
| 519806 | 10/1938 | United Kingdom . |
| 542429 | 2/1941 | United Kingdom . |
| 561932 | 10/1944 | United Kingdom . |
| 572724 | 10/1945 | United Kingdom . |

*Primary Examiner*—Douglas Hart
*Attorney, Agent, or Firm*—Ernest A. Beutler

[57] ABSTRACT

A motorcycle having an exhaust system with an exhaust control valve that is provided to improve engine mid-range performance without adversely affecting high range performance. Several embodiments of valves are disclosed, all of which include a valve member that is movable to a position to obstruct the flow through the exhaust gas but is also movable to an opened position wherein the exhaust gas flow is completely unobstructed. The exhaust control valve is suspended independently from the chassis and is configured so as to promote smooth flow of exhaust gases through it.

60 Claims, 9 Drawing Sheets

EXHAUST GAS CONTROL DEVICE FOR ENGINES

BACKGROUND OF THE INVENTION

This invention relates to an exhaust control device for engines and more particularly to an improved exhaust control valve for improving performance and an arrangement for employing such a valve in a vehicle such as a motorcycle and a structure for protecting and cooling the valve.

It is well known that the configuration of the exhaust system for an internal combustion engine can significantly affect its performance. It has been the practice to tune the exhaust systems so that they will provide optimum performance at certain desired running conditions. For example, it has been proposed to emply an arrangement for multiple cylinder engines wherein individual exhaust pipes from the engine exhaust ports all merge into a common expansion chamber before discharge to the atmosphere. Such an arrangement has been found to significantly improve high speed performance. However, the same system has been found to produce less than desired mid-range performance because the exhaust gases from one of the exhaust pipes adversely affect the flow of exhaust gases from the ports of other of the exhaust pipes under less than full throttle condition. The reason for this is that pressure pulses are caused to be developed in the exhaust pipes that actually block the flow of exhaust gases from the cylinders under less than full range performance.

As disclosed in the copending applications entitled "Exhaust Gas Control Means for Engine", Serial No. 22,660 and 22,732, filed Mar. 6, 1987 in the name of Tadashi Sakuri et al., and assigned to the assignee of this application, there are disclosed arrangements that employ valves in the exhaust pipes for blocking these pulsations from interfering with the flow of exhaust gases. As a result, it is possible to tune the exhaust system for maximum performance and also to insure against a dip in the performance curve at mid-ranges by employing such a valve. Although this arrangement will improve this performance, the use of an exhaust control valve of this type may present some difficulties.

For example, the exhaust control valves as shown in those applications include a valve member that is movable between an opened position and a closed position for improving the performance depending upon the engine running condition. However, even when the valve is in its fully opened position, the valve member extends across the portion of the exhaust pipe that communicates with the expansion chamber and thus offers flow resistance. Such an arrangement can reduce the maximum power output of the engine.

It is, therefore, a principal object of this invention to provide an improved exhaust control valve for an engine exhaust system that will improve mid-range performance and which will not interfere with high speed performance.

It is a further object of this invention to provide an improved exhaust control valve wherein the valve member does not occupy any portion of the exhaust pipe when the valve is in its opened position.

In addition to the flow resistance problems aforedescribed, there is also some difficulty when a butterfly-type throttle valve is employed and in which the throttle valve shaft extends across the exhaust pipe. The valve shaft itself will act to obstruct the flow through the exhaust passage and thus present the disadvantages described above. In addition, the exhaust valve shaft is directly exposed to the exhaust gases and will become highly heated. As a result of this heating, there can be difficulties arise in connection with the operation of the valve.

It is, therefore, another principal object of this invention to provide an improved valve for exhaust control where the valve shaft is not disposed in the flow of exhaust gases so it will not be heated.

Engines having exhaust systems with exhaust control valves are frequently employed in motor vehicles. For example, motorcycles are a prime application for an engine having an exhaust system of this type since it is desirable to provide good performance for the motorcycle under all running conditions. In a motorcycle, the exhaust system normally comprises exhaust pipes that extend from the engine exhaust ports and a muffler that discharges the exhaust gases to the atmosphere. If an exhaust control valve is employed for improving mid-range performance, the exhaust control valve is normally supported in a cantilevered fashion from the engine exhaust ports. As a result of this and due to the relatively heavy weight of the exhaust control valve, damage to the exhaust system may result.

It is, therefore, another principal object of this invention to provide an improved exhaust system for a vehicle such as a motorcycle and which employs a control valve.

It is a further object of this invention to provide an improved arrangement for suspending an exhaust control valve of a vehicle.

As has been noted, it is practice to employ an expansion chamber for multiple cylinder engines with all of the exhaust pipes merging into a common expansion chamber. Furthermore, the expansion chamber normally communicates with the atmosphere through an exhaust pipes are merged into a common expansion chamber and a control valve is provided in this expansion chamber, it is important to insure that the flow of exhaust gases through the control valve body expansion chamber and discharge is smooth and regular. If the outlet from the expansion chamber is offset, as is commonly required with motorcycles, the placement of the individual exhaust pipes and their communication with the valve body can give rise to flow restrictions.

It is, therefore, another principal object of this invetion to provide an improved control valve arrangement for a multiple cylinder engine wherein a smooth flow is provided through the exhaust valve and expansion chamber.

It is a further object of this invention to provide an exhaust control valve for multiple cylinder engines wherein the flow is uniform through the exhaust pipes of the individual cylinders and unobstructed through the exhaust control valve.

As a specific example of a motorcycle exhaust system employing an exhaust control valve and a multiple cylinder engine, it is the practice to position the control valve beneath the engine transmission assembly. For simplicity, it is desirable to employ a single muffler and this muffler is normally positioned at one side of the motorcycle. Therefore, there are problems as aforenoted in obtaining equal flow through the exhaust pipes and smooth flow through the exhaust system.

It is, therefore, another object of this invention to provide an improved exhaust system for a multiple cylinder motorcycle engine.

As noted above, the exhaust control valve is normally provided in an area at a low position in a motorcycle, for example, under the engine transmission assembly. The exhaust control valve employs a mechanism for operating the valve and this is normally positioned externally of the valve body. As a result, the actuating mechanism is disposed in an area where it might become damaged. Although the system can be protected by enclosing it, then the heating of the components becomes a problem.

It is, therefore, yet another principal object of this invention to provide an improved arrangement for controlling the exhaust gases in a vehicle such as a motor cycle and also for cooling the exhaust control device and protecting it.

SUMMARY OF THE INVENTION

A first feature of this invention is adapted to be embodied in an exhaust system for an internal combustion engine having an exhaust port and which exhaust system comprises an expansion chamber and an exhaust pipe for conveying exhaust gases from the exhaust port to the expansion chamber. Valve means control the communication of the exhaust pipe with the expansion chamber and include a valve member that is movable between a closed position wherein the valve member obstructs at least a portion of the flow area of the exhaust pipe where the exhaust pipe communicates with the expansion chamber and an opened position wherein the valve member does not obstruct any flow area of the exhaust pipe.

Another feature of the invention is also adapted to be embodied in an exhaust system for an engine having an exhaust port and which exhaust system includes an expansion chamber, and exhaust pipe for conveying exhaust gases to the expansion chamber from the exhaust port and valve means for controlling the communication of the exhaust pipe with the expansion chamber. In accordance with this feature of the invention, the valve means includes shaft means that journal the valve member for rotation about an axis that intersects the exhaust pipe but which shaft means does not obstruct the flow through the exhaust pipe.

A further feature of this invention is adapted to be embodied in a motor vehicle having a chassis, at least one driven wheel, an internal combustion engine for driving the driven wheel and an exhaust system for the engine. The exhaust system includes an exhaust pipe that extends from the port of the engine to a remotely positioned exhaust control valve. The exhaust control valve is positioned contiguous to the chassis and is supported directly from the chassis.

Another feature of the invention is also adapted to be embodied in a motor vehicle that has a chassis, at least one driven wheel, an internal combustion engine for driving the driven wheel and an exhaust system including an exhaust control valve for conveying exhaust gases from the engine exhaust ports to the atmosphere. In accordance with this feature of the invention, an exhaust pipe lies on one side of the vehicle and the exhaust control valve has an exhaust discharge that lies on the other side of the vehicle. The exhaust control valve has a valve body that is disposed at an angle to the vehicle so that the exhaust gases flow from the one exhaust pipe to the discharge in a substantially straight line through the valve.

A still further feature of the invention is adapted to be embodied in a control valve for the exhaust system of an internal combustion engine. The control valve includes a valve member and an actuating device for it. A cover is juxtaposed to the control valve and has an air inlet opening and an air output opening through which air can pass to cool the control valve.

DETAILED DESCRIPTION OF THE PREFERRED EMBODIMENTS

Figure 1:
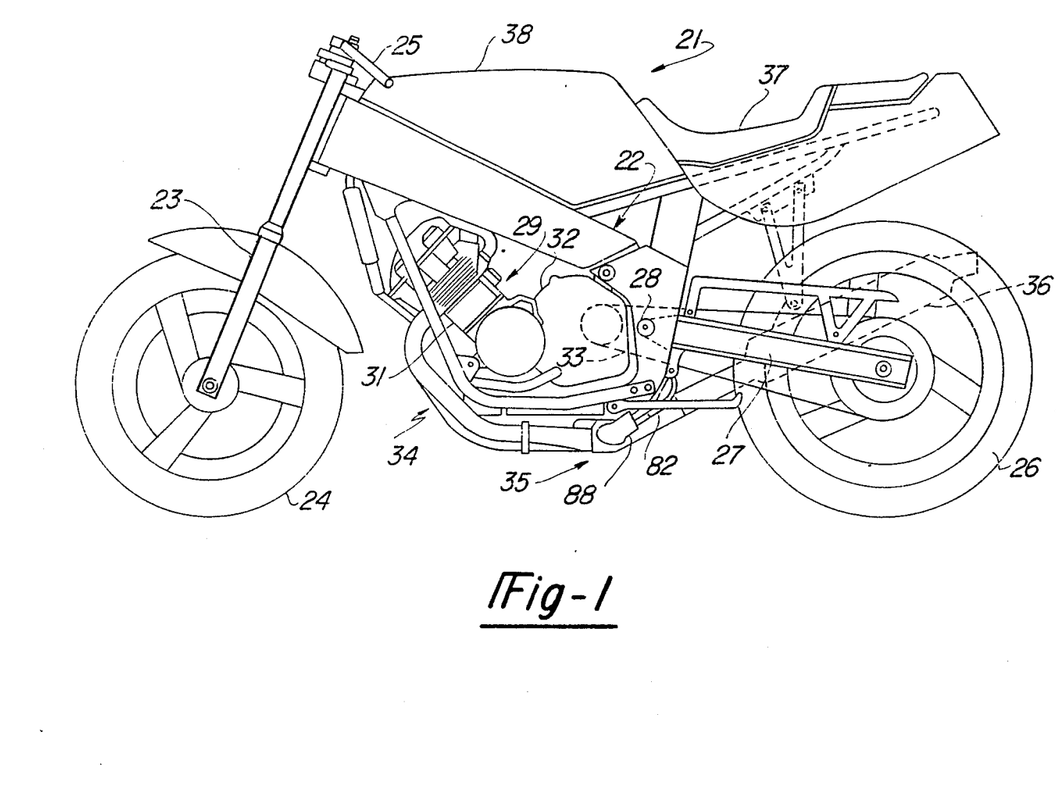
FIG. 1 is a side elevational view of a motorcycle constructed in accordance with an embodiment of the invention.
Figure 2:
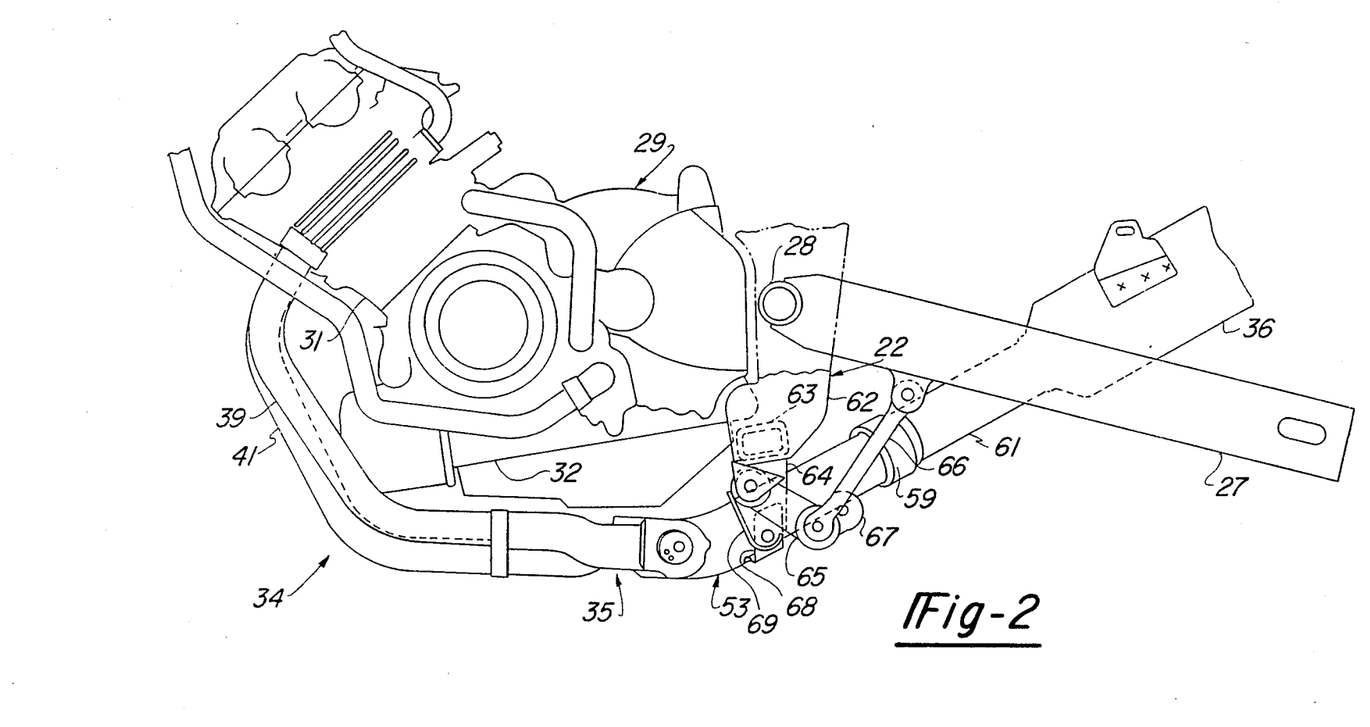
FIG. 2 is an enlarged side elevational view of the motorcycle engine and exhaust system.
Figure 3:
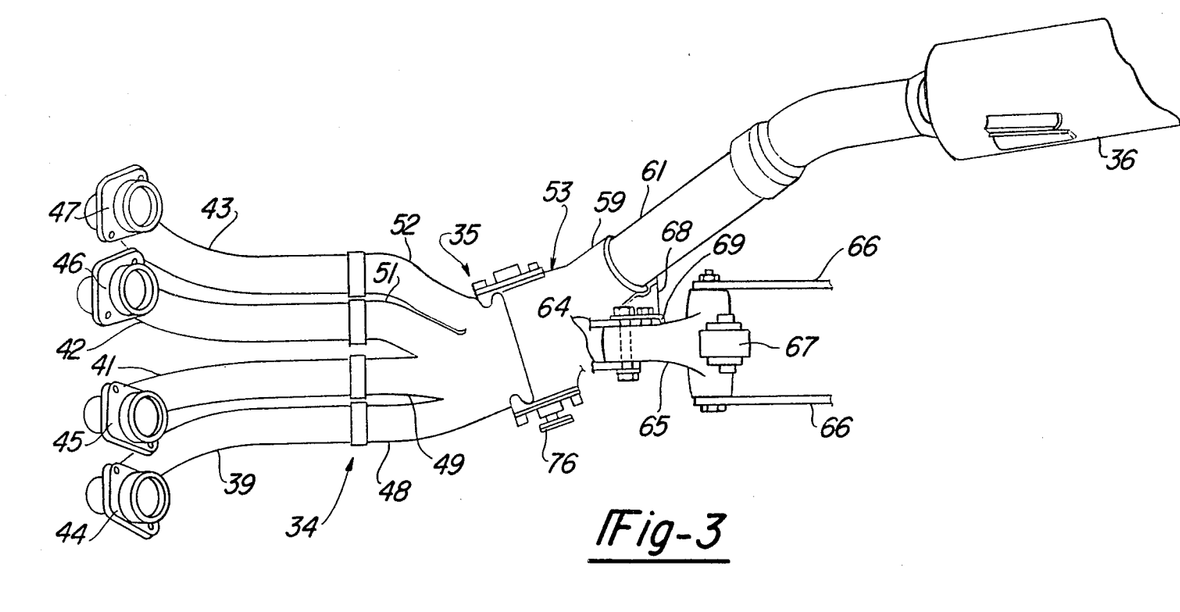
FIG. 3 is a top plan view of the exhaust system with the other components of the motorcycle removed to more clearly show the construction.
Figure 4:
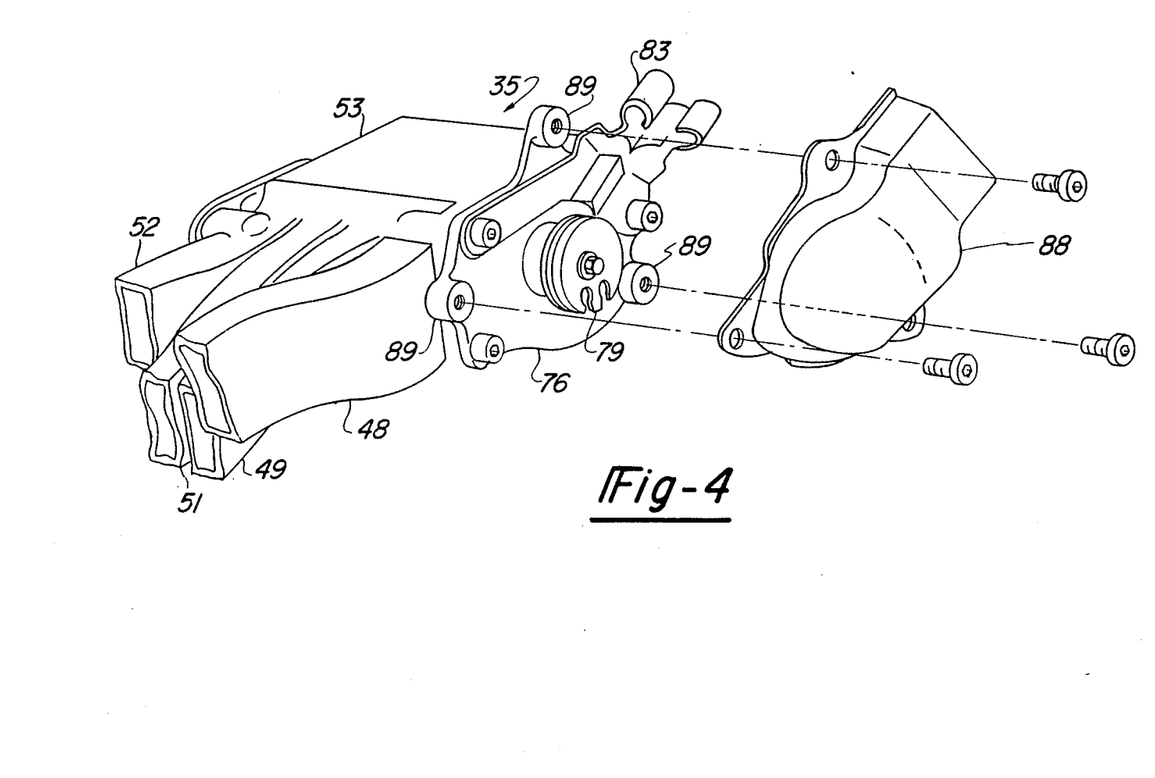
FIG. 4 is a partially explosed perspective view showing the exhaust control valve of the engine.

Referring first to FIG. 1, a motorcycle powered by an internal combustion engine having an exhaust system constructed in accordance with an embodiment of the invention is identified generally by the reference numeral 21. The invention is described in conjunction with a motorcycle inasmuch as certain facets of the invention have particular utility with such vehicles. It is to be understood, however, that certain facets of the invention may be utilized with other types of vehicles, or, for that matter, with other applications for internal combustion engines.

The motorcycle 21 is comprised of a chassis including a frame assembly 22 that dirigibly supports at its forward end a front fork 23 which, in turn, rotatably journals a front wheel 24. The front wheel 24 may be steered by means of a handlebar assembly 25 that is connected to the front fork 23 in a known manner. A rear wheel 26 is journaled by means of a trailing arm assembly 27 which, in turn, is pivotally supported on the frame assembly 22 by means of a pivot joint 28. The rear wheel 26 is driven by an internal combustion engine, transmission combination, indicated generally by the reference numeral 29 and which is supported centrally of the frame 22 in a known manner. The engine transmission assembly 29 includes an engine 31 which, in the illustrated embodiment, is of the four cylinder in-line type with its crankshaft rotating about a transversly disposed axis. This crankshaft (not shown) drives a change speed transmission 32 which is contained within the crankcase of the engine 31, as is typical in motorcycle practice, for driving the rear wheel 26 by means of a chain 33.

The engine 31 is provided with an exhaust system, indicated generally by the reference numeral 34, and containing an exhaust control valve 35 that is constructed in accordance with the invention. The exhaust control valve 35 discharges into a muffler 36 which is disposed at one side of the motorcycle 21 and which discharges to the atmosphere adjacent the rear wheel 26 on one side thereof.

A seat 37 is supported on the frame 22 and a fuel tank 38 is also supported on the frame 22 forwardly of the seat 37 and rearwardly of the handlebar 25.

Further details of the construction of the motorcycle 21, except insofar as will hereinafter be described, are unnecessary to understand the construction of the invention, which relates primarily to the exhaust system 34 and, for that reason, the foregoing description of the construction of the motorcycle 21 is believed to be adequate to permit those skilled in the art to understand the invention.

Referring now primarily additionally to FIGS. 2 through 5, the exhaust system 34, as has already been noted, includes an exhaust control valve 35 and muffler 36. The engine 31, as aforenoted, is transversely disposed and is arranged so that its exhaust ports extend forwardly and downwardly. Inasmuch as the engine 31 is, in the illustrated embodiment, of the four cylinder type, there are four exhaust ports which communicate with four exhaust pipes 39, 41, 42 and 43. The exhaust pipes 39, 41, 42 and 43 have respective flanges 44, 45, 46 and 47 at their inlet ends that are affixed to and communicate with the exhaust ports of the engine. The downstream end of the exhaust pipes 39, 41, 42 and 43 have a slip joint connection to branch inlet pipes 48, 49, 51 and 42, respectively, of the control valve 35.

The branch pipes 48, 49, 51 and 52 may be formed integrally with a main body portion 53 of the control valve 35 which main body portion is conveniently formed as a casting from a material such as stainless steel. It should be noted that, in a horizontal plane, the branch pipes 48, 49, 51 and 52 are configured so that they will lead the exhaust gases in a path so that they will be directed generally transversely across the underside of the engine, transmission assembly 29. The reason for this is to insure good and smooth flow of the exhaust gases through the valve 31 and branch pipes 48, 49, 51 and 52 without necessitating any sharp curves and while maintaining substantially equal length for each of the exhaust bramch pipes. It should also be noted from FIGS. 2 and 4 that the exhaust branch pipes 48 and 52 extend somewhat upwardly in a common plane while the branch pipes 49 and 51 extend somewhat downwardly. This is done to insure good flow and a compact configuration.

Figure 8:
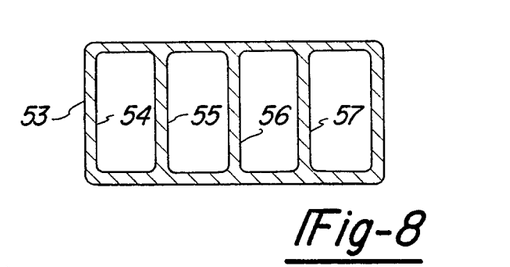
FIG. 8 is a cross-sectional view taken along the line 8—8 of FIG. 5.
Figure 9:
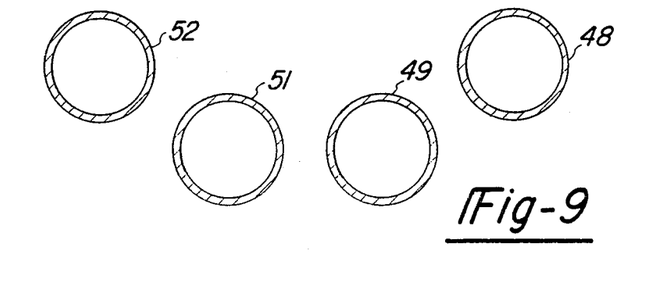
FIG. 9 is a cross-sectional view taken along the line 9—9 of FIG. 5.

The branch pipes 48, 49, 51 and 52 merge from their generally cylindrical shape at their inlet ends where they have the slip connection to the ends of the exhaust pipes 39, 41, 42 and 43 to generally rectangular discharge sections 54, 55, 56 and 57. This transition in shape is shown by the cross-sectional views of FIGS. 8 and 9 wherein the cylindrical inlet sections are shown in circular fashion while the rectangular discharge sections 54, 55, 56 and 57 are shown in FIG. 8.

The discharge sections 54, 55, 56 and 57 communicate with an enlarged expansion chamber 58 formed within the valve body 53 and which extends generally transversely across the underside of the engine transmission assembly 29 and which also is inclined upwardly to the rear. Again, this results in good flow through the exhaust system while at the same time permitting a compact configuration on the underside of the motorcycle to maximize the ground clearance.

The expansion chamber 58 terminates in a discharge fitting 59 which has a generally cylindrical shape and is formed by the body portion 53. It should be noted that the discharge fitting 59 also extends generally transversely across the body of the motorcycle 21 and discharges in an upward direction. The muffler 36 is provided with an inlet end 61 that has a slip connection to the control valve outlet fitting 69 so as to communicate the exhaust gases from the expansion section 58 to the muffler 36 for discharge to the atmosphere.

In normal motorcycle practice, the muffler is suspended from the chassis of the motorcycle and the forward end of the exhaust pipes are connected to the engine and suspended from the chassis via the engine. However, the remainder of the exhaust system is supported in a generally cantilevered fashion. In conjunction with the use of a control valve as the control valve 35, this provides a fairly substantially heavy portion which is not supported and can give rise to certain problems. Among these problems are undue vibration and difficulty in aligning the exhaust pipes with the exhaust control valve.

In accordance with one feature of the invention, therefore, the exhaust control valve 35 and specifically the body porton 53 is mounted directly from the chassis or frame 22. To this end, the frame 22 is provided with a pair of brackets or suspension members 62 (FIG. 2) that are juxtaposed to the exhaust control valve 35. These extend downwardly along the rear side of the engine and are connected to each other by means of a cross bracket 63. A pair of suspension plates 64 depend from the cross bracket 63 and journal one end of a suspension link 65. The other end of the suspension link 65 is pivotally connected to a pair of links 66 which are, in turn, pivotally connected at their other ends to the trailing arm 27 for assisting in its location and support. The link 65 is also conneced to a shock absorber 67 (FIG. 3) for suspending the rear wheel in a known manner.

A bracket 68 is affixed to the control valve body 53 and is, in turn, affixed to a suspension plate 69 that is connected to the brackets 64 for suspension of the control valve body 53 directly from the frame 22. If desired, elastic suspension elements as are normally employed with exhaust systems may be incorporated to suspend the control valve 35 from the frame 22.

As has already been noted, the communication of the exhaust pipes 39, 41, 42 and 43 with an expansion chamber 58 has been found to significantly increase the high speed performance of the engine. The reason for this is that the exhaust pulses from one cylinder tend to help extract the exhaust gases from another cylinder during high speed running. However, when running under mid-range conditions, these exhaust pulses interfere with each other and, rather than assisting in the performance, interfere with it. As a result, the torque curve of the engine will have a dip or valley that gives poor running conditions and poor performance impressions to the rider.

In accordance with the invention, the control valve 35 includes a valve member, indicated generally by the reference numeral 71, and which is effective to prevent these adverse exhaust pulses from traveling from one of the exhaust pipes 39, 41, 42 and 43 through the expansion chamber 58 back to the exhaust ports served by the other exhaust pipes. In fact, the use of the control valve 71 can still further improve performance by creating sonic pulses that travel back and forth and improve exhaust extraction.

Figure 7:
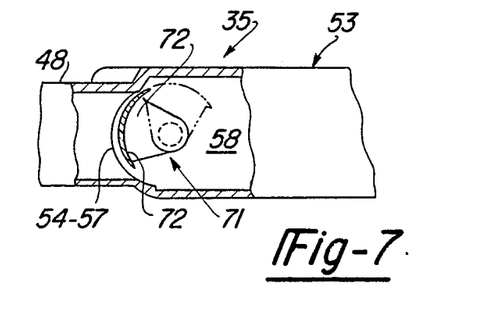
FIG. 7 is a side elevational view, in part similar to FIG. 6, showing the valve element in cross-section.

The control valve member 71 includes an arcuate valve plate 72 having a curved configuration which, as may be seen from FIG. 7, is generally complementary in curvature to the concave discharge ends of the branch section portions 54, 55, 56 and 57 where they discharge into the expansion chamber 58. At its opposite ends, the arcuate section 72 is connected by crank portions 73 to respective stub shafts 74 and 75. The stub shafts 74 and 75 are journaled in respective bearing plates 76 and 77 that are affixed to openings formed in the opposite sides of the valve body 53.

Figure 5:
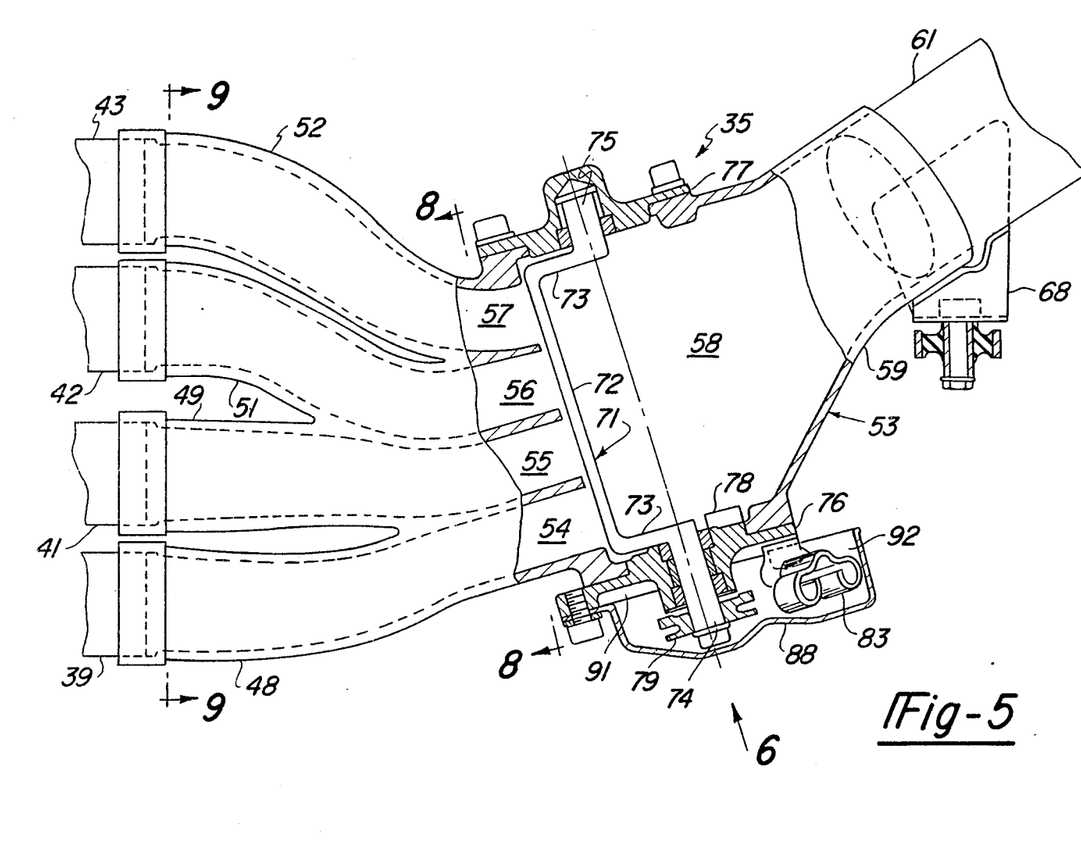
FIG. 5 is a further enlarged top plan veiw of the exhaust control valve with a portion broken away to more clearly show the construction.
Figure 6:
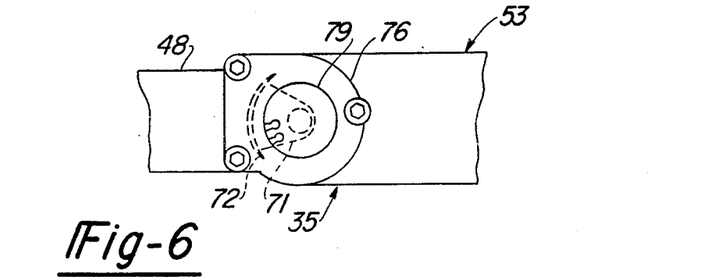
FIG. 6 is a view looking in the direction of the arrow 6 in FIG. 5.

Because of this configuration, when the valve member 71 is moved from a fully closed position, as shown in FIG. 5 through 7, to a fully opened position, as shown in the phantom line view of FIG. 7, the valve member 71 will not obstruct any flow through the branch section outlets 54 through 57. In addition, the stub shafts 74 and 75 are clear of the exhaust gases and, even though the rotational axis for the valve member 71 passes through the center of the passages 54 through 57, there will be no flow obstruction. Furthermore, the fact that the stub shafts 74 and 75 and valve member 72 are out of contact with the exhaust gases in their fully opened position insures that the heating of these components will be minimized. It should be noted that the bearing plate 76 has a lug portion 78 that is adapted to be contacted by the crank part 73 to limit the fully opened position for the valve member 71.

In its fully closed position as shown in the solid line view of FIG. 7 and FIG. 6, the valve member 71 obstructs from seventy to fifty percent of the flow passage, depending on the particular engine, so as to improve the running performance, as aforenoted. As the speed and load of the engine increase, the valve member 71 is moved to its opened position so that high end performance will not be adversely affected.

The mechanism for controlling the position of the valve member 71 will now be described by particular reference to FIGS. 5, 6, 11 and 12. It will be noted that the stub shaft 74 extends through the bearing plate 76 and has its end exposed. A pulley 79 is affixed to this exposed end of the stub shaft 74 in a non-rotational manner as by means of a nut and key. The pulley 79 has affixed to it a pair of wire transmitters 81 each of which extends through an elongated protective sheath 82 which sheath terminates at a controller (not shown) that is responsive to an engine running condition such as engine speed. The controller is effective to tension selected ones of the wire transmitters 81 and effect rotation of the pulley 79 in the desired direction so as to position the control valve member 71 as aforedescribed. The specific system of control and the sequence of operation will depend upon a variety of factors but it is believed that those skilled in the art will readily be able to determine how to effectively control the valve member 71 so as to maximize performance throughout the entire engine load and speed ranges.

The lower ends of the protective sheaths 82 are retained in a retainer plate 83 that is affixed to the bearing plate 76 by means of a bolt (not shown). The retainer plate 83 receives a pair of metal wire guides 84 that loosely retain the protective sheaths 82. The lower ends of the protective sheaths 82 are recessed, as at 85, so as to receive snap retaining clips 86 for axially holding the protective sheaths in position. An insulating sleeve 87 is interposed between the retainer 83 and the metal sleeve 84 so as to reduce heat transmission.

It should be noted that the valve assembly 35 is positioned at a low point and could become damaged during riding. In order to protect the pulley 79, stub shaft end 74 and the actuating mechanism, a cover plate, indicated generally by the reference numeral 88 is provided. The cover plate 88 is designed, however, in such a way that it will also act as a cooling device for cooling the valve mechanism.

Figure 10:
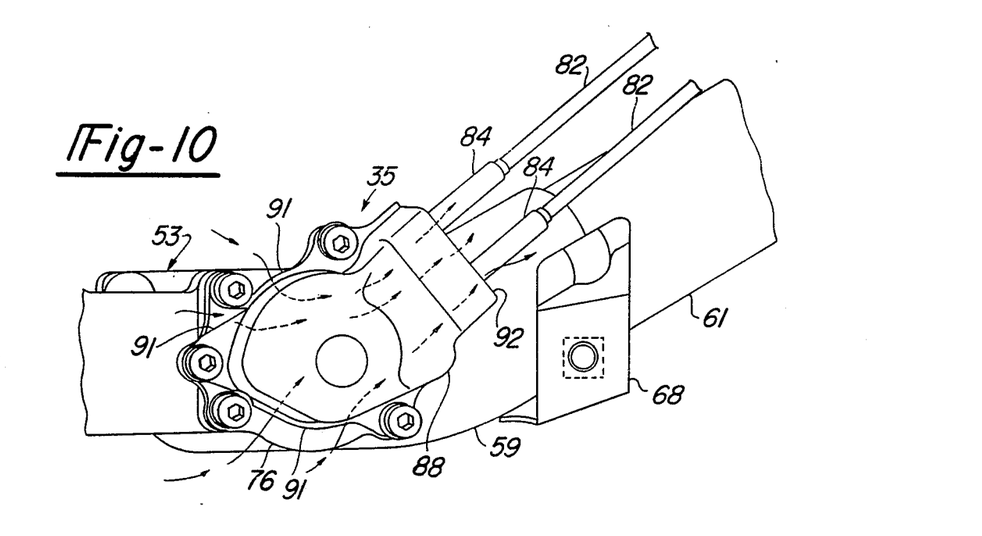
FIG. 10 is a side elevational view showing the exhaust control valve with the cooling cover plate in position.
Figure 11:
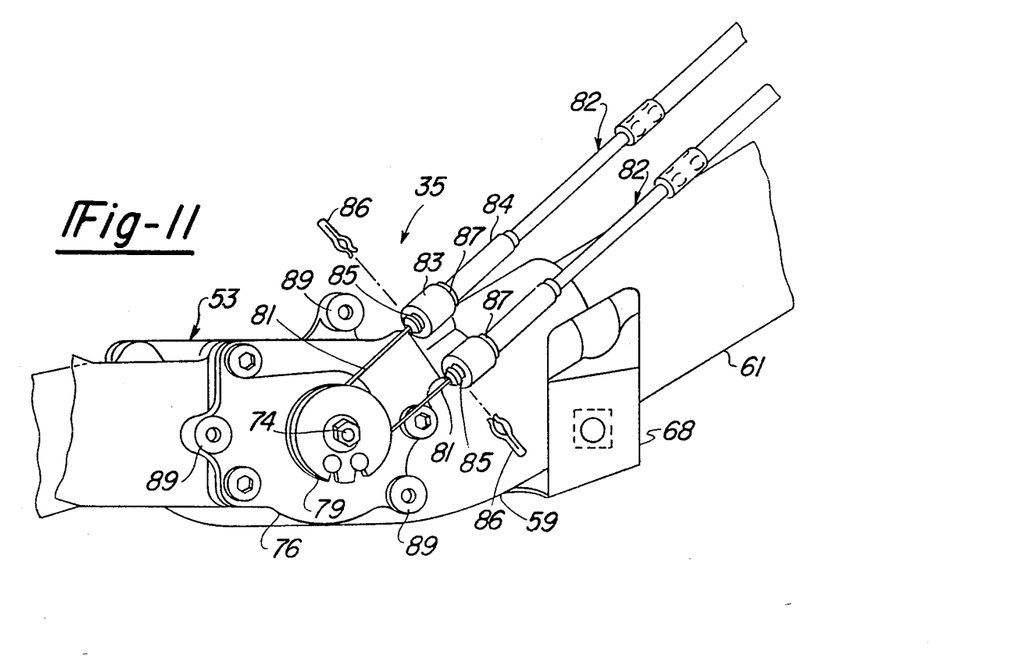
FIG. 11 is a side elevational view, in part similar to FIG. 10, showing the cooling cover plate removed.

The cover plate 88 is affixed to mounting bosses 89 formed on the bearing plate 76. The bosses 89 and configuration of the cover plate 88 are such, however, that inlet air openings 91 will be formed when the cover plate 88 is in position (FIG. 10). These inlet openings 91 face forwardly and downwardly and upwardly respectively, and permit air to flow into the chamber defined between the cover plate 88 and the bearing plate 76. This air is extracted upwardly and rearwardly through a discharge opening 92 so as to afford cooling air flow. In addition, since one of the inlet openings 91 is positioned at a lower and downward position, any foreign material that may flow into this area can conveniently drain out. As a result, good protection is provided and, at the same time, cooling of the valve assembly 35 is insured.

In the embodiment of the invention as thus far described, the control valve 35 and specifically the control valve member 71 was supported in such a way that it and its supporting shaft would not interfere with the flow of exhaust gases when the control valve was in its opened position. In the embodiment thus far described, the shaft portions 74 and 75 define an axis was positioned downstream of the point of discharge of the exhaust branches 54 through 57. It should be understood that these results can be achieved by different configurations and one such alternative configuration is shown in FIGS. 12 and 13.

Figure 12:
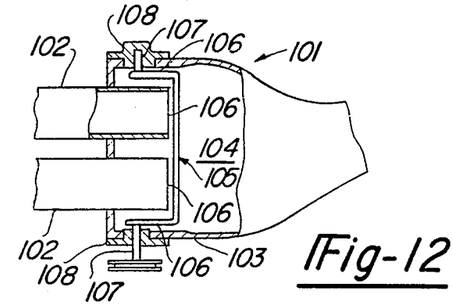
FIG. 12 is a horizontal cross-sectional view taken through an exhaust control valve constructed in accordance with another embodiment of the invention.
Figure 13:
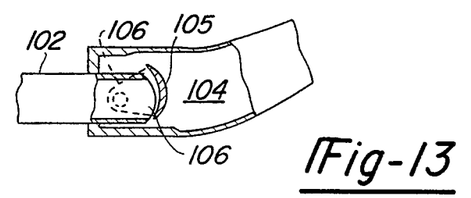
FIG. 13 is a side elevational view, with a portion shown in section, of the control valve of the embodiment of FIG. 12.

Referring now to FIGS. 12 and 13, the control valve is indicated generally by the reference numeral 101. It should be noted that exhaust pipes 102 extend into a control valve body 103 and terminate in an expansion chamber 104 formed therein. In this embodiment, only two exhaust pipes 102 are shown but it is believed that the application of this principle to engines having other numbers of cylinders will be readily apparent to those skilled in the art.

In this embodiment, a control valve member, indicated generally by the reference numeral 105, has an arcuate configuration which is complementary in shape to concave arcuate ends 106 of the exhaust pipes 102. The arcuate section 105 is connected by crank-shaped sections 106 to a pair of stub shafts 107 that are journaled in bearing plates 108 as in the previously described embodiment. In this embodiment, however, the stub shafts 107 have their axes of rotation disposed forwardly of but in line with the exhaust pipes 102. This results in a compact assembly and the stub shafts 107 are still further removed from the heat of the exhaust gases.

It should be readily apparent that rotation of the valve element 105 from the fully closed position shown in the figures to a fully opened position will cause it to be clear of the exhaust pipe ends 106 and thus there will be free flow of the exhaust gases in the fully opened position without any restriction.

Figure 14:
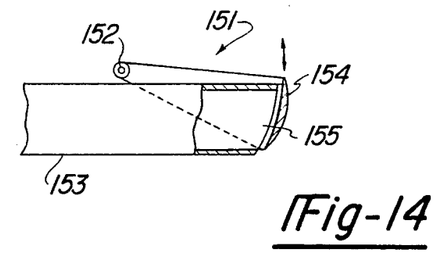
FIG. 14 is a partial side elevational view, with a portion broken away, of another control valve member.

A control valve constructed in accordance with yet another embodiment of the invention is shown in FIG. 14 and is identified generally by the reference numeral 151. The control valve 151 of this embodiment is generally similar to the embodiment of FIGS. 12 and 13, however, in this embodiment, the stub shaft ends 152 are offset from the exhaust pipes 153 and positioned upstream. A valve member 154 having a concave arcuate configuration is journaled by the stub shafts 152 and cooperates with convex configured ends 155 of the exhaust pipes 153. In other regards, this embodiment operates in the same manner as the previously described embodiment.

Figure 15:
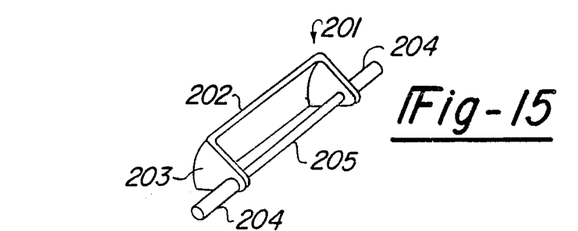
FIG. 15 is a perspective view of a control valve member of another embodiment of the invention.

Yet another embodiment of the invention is shown in FIG. 15 and incorporates a control valve member, indicated generally by the reference numeral 201. In this embodiment, only the control valve member 201 is illustrated since the control valve member 201 is mounted in a manner similar to the control valve of the embodiment of FIGS. 1 through 11. In this embodiment, the control valve member 201 has an arcuately configured valve part 202 that cooperates with the discharge ends of the branch pipes 54 through 57. Crank-shaped portions 203 connect the valve plate 202 to a pair of stub shafts 204. In this embodiment, the stub shafts 204 are interconnected by means of a bridging shaft 205 which provides heat transfer and will minimize the effects of thermal expansion to avoid distortion. However, the diameter of the portion 205 is substantially smaller than the diameter of the stub shafts 204 and, hence, will not restrict exhaust gas flow significantly. Also, since the shaft portion 205 is positioned in the main expansion chamber 58, there will be less likelihood of restriction to exhaust gas flow.

Figure 16:
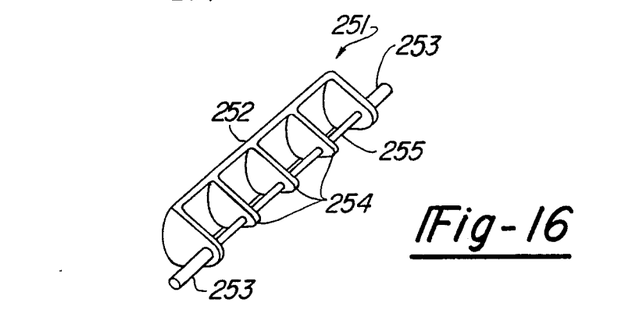
FIG. 16 is a perspective view of a control valve member constructed in accordance with yet another embodiment of the invention.

A control valve member constructed in accordance with yet another embodiment of the invention is shown in FIG. 16 and is identified generally by the reference numeral 251. The control valve member 251 of this embodiment is substantially the same as the control valve member 201 of the previously described embodiment and includes an arcuate valve plate 252 that is supported by stub shafts 253. In this embodiment, however, there are provide intermediate dividing sections 254 that separate the individual exhaust gas passages from each other. Again, a small diameter shaft section 255 connects the stub shaft ends 254 so as to minimize the effect of thermal distortion without significantly affecting exhaust has flow.

Figure 17:
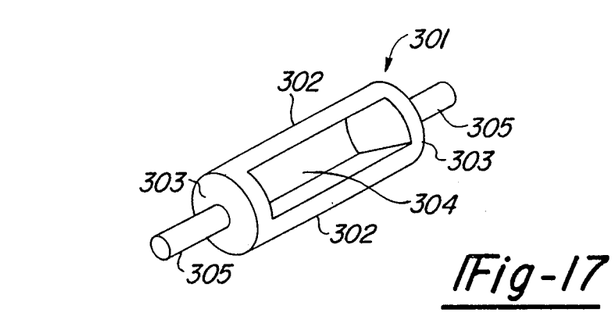
FIG. 17 is a perspective view of a still further embodiment of control valve member.

A still further embodiment of the invention is shown in FIG. 17 wherein a control valve member constructed in accordance with this embodiment is identified generally by the reference numeral 301. Like the embodiments of FIGS. 15 and 16, this embodiment is adapted to be incorporated in a control valve of the type shown in FIGS. 1 through 11 and, for that reason, only the valve member 301 is illustrated. The valve member 301 has a pair of arcuate sections 302 that are connected at their ends to each other by disk-shaped parts 303. An open gap 304 is provided between the sections 302. The disk-shaped sections 303 have outwardly extending stub shafts 305 that are journaled for rotation in the bearing plates 76 and 77 of the valve body.

Only one of the sections 302 provides a valving function while the other section will serve to transmit heat between the disk-shaped sections 303 and stub shafts 305 so as to minimize the effects of thermal expansion.

It should be readily apparent from the foregoing description that a number of embodiments of exhaust control valves have been illustrated and described each of which provides good engine performance throughout the entire engine load and speed ranges without adversely affecting high speed performance since little or no resistance to exhaust gas flow is provided under high speed running. In addition, the construction is such that the exhaust gases may smoothly flow through the control valve even when it is mounted on the underside of a motorcycle and discharges through a single tailpipe. Furthermore, the control valve is suspended independently from the vehicle frame so as to minimize vibration and alignment problems. In addition, the control valve operating mechanism is protected but the device is also adequately cooled.

Although a number of embodiments of the invention have been illustrated and described, various other changes and modifications may be made without departing from the spirit and scope of the invention, as defined by the appended claims.

I claim:

1. In an exhaust system for an internal combustion engine having an exhaust port, said exhaust system comprising an expansion chamber, an exhaust pipe for conveying exhaust gases from said exhaust port to said expansion chamber, and valve means for controlling the communication of said exhaust pipe with said expansion chamber, the improvement comprising said valve means comprising a valve member movable between a closed position wherein said valve member obstructs at least a portion of the flow area of said exhaust pipe where said exhaust pipe communicates with said expansion chamber and an opened position wherein said valve member does not obstruct any flow area of said exhaust pipe.

2. In an exhaust system as set forth in claim 1 wherein the valve member is positioned within the expansion chamber in all of its positions.

3. In an exhaust system as set forth in claim 1 wherein the valve member is movable into a confronting position with the exhaust pipe end when in its closed position.

4. In an exhaust system as set forth in claim 1 wherein the valve member is rotatable and is supported upon a shaft.

5. In an exhaust system as set forth in claim 4 wherein the shaft axis passes through the flow area of the exhaust pipe.

6. In an exhaust system as set forth in claim 5 wherein the shaft does not pass through the flow area of the exhaust pipe.

7. In an exhaust system as set forth in claim 6 wherein the shaft is interrupted.

8. In an exhaust system as set forth in claim 7 wherein the shaft is positioned downstream from the exhaust pipe end.

9. In an exhaust system as set forth in claim 7 wherein the shaft is positioned upstream of the exhaust pipe end.

10. In an exhaust system as set forth in claim 6 wherein the valve member is arcuate.

11. In an exhaust system as set forth in claim 10 wherein the valve member is convex as it faces the exhaust pipe end and the exhaust pipes end is concave.

12. In an exhaust system as set forth in claim 10 wherein the valve member is concave as it faces the exhaust pipe end and the exhaust pipe end is convex.

13. In an exhaust system as set forth in claim 4 wherein the shaft is disposed eccentrically to the exhaust pipe.

14. In an exhaust system as set forth in claim 13 wherein the shaft does not pass through the flow area of the exhaust pipe.

15. In an exhaust system as set forth in claim 13 wherein the valve member is concave as it faces the exhaust pipe end and the exhaust pipe end is convex.

16. In an exhaust system as set forth in claim 1 wherein the engine has a plurality of exhaust ports and there are a plurality of exhaust pipes for conveying exhaust gases from each of the exhaust ports to the expansion chamber, the valve means cooperating with each of the exhaust pipes.

17. In an exhaust system as set forth in claim 16 wherein the valve member is positioned within the expansion chamber in all of its positions.

18. In an exhaust system as set forth in claim 17 wherein the valve member is movable into a confronting position with the exhaust pipe ends when in its closed position.

19. In an exhaust system as set forth in claim 16 wherein the valve member is rotatable and is supported upon a shaft.

20. In an exhaust system as set forth in claim 19 wherein the shaft axis passes through the flow area of the exhaust pipes.

21. In an exhaust system as set forth in claim 21 wherein the shaft does not pass through the flow area of the exhaust pipes.

22. In an exhaust system as set forth in claim 21 wherein the shaft is interrupted.

23. In an exhaust system as set forth in claim 22 wherein the shaft is positioned downstream from the exhaust pipe ends.

24. In an exhaust system as set forth in claim 22 wherein the shaft is positioned upstream of the exhaust pipe ends.

25. In an exhaust systetm as set forth in claim 21 wherein the valve member is arcuate.

26. In an exhaust system as set forth in claim 25 wherein the valve member is convex as it faces the exhaust pipe ends and the exhaust pipe ends are concave.

27. In an exhaust system as set forth in claim 25 wherein the valve member is concave as it faces the exhaust pipe ends and the exhaust pipe ends are convex.

28. In an exhaust system as set forth in claim 19 wherein the shaft is disposed eccentrically to the exhaust pipes.

29. In an exhaust system as set forth in claim 28 wherein the shaft does not pass through the flow area of the exhaust pipes.

30. In an exhaust system as set forth in claim 28 wherein the valve member is concave as it faces the exhaust pipe ends and the exhaust pipe ends are convex.

31. An exhaust system for an internal combustion having an exhaust port, said exhaust system comprising an expansion chamber, an exhaust pipe for conveying exhaust gases from said exhaust port to said expansion chamber, and valve means for controlling the communication of said exhaust pipe with said expansion chamber, the improvement comprising said valve means comprising a valve member movable between a closed position wherein said valve member obstructs at least a portion of the flow area of said exhaust pipe where said exhaust pipe communicates with said expansion chamber and an opened position and shaft means journaling said valve member for rotation about an axis that intersects said exhaust pipe but which shaft means does not obstruct the flow through said exhaust pipe.

32. An exhaust system as set forth in claim 31 wherein the shaft is interrupted.

33. An exhaust system as set forth in claim 32 wherein the shaft is positioned downstream from the exhaust pipe end.

34. An exhaust system as set forth in claim 32 wherein the shaft is positioned upstream of the exhaust pipe end.

35. An exhaust system as set forth in claim 31 wherein the engine has a plurality of exhaust ports and there are a plurality of exhaust pipes for conveying exhaust gases from each of the exhaust ports to the expansion chamber, the valve means cooperating with each of the exhaust pipes.

36. An exhaust system as set forth in claim 35 wherein the shaft is interrupted.

37. In an exhaust system as set forth in claim 36 wherein the shaft is positioned downstream from the exhaust pipe ends.

38. In an exhaust system as set forth in claim 36 wherein the shaft is positioned upstream of the exhaust pipe ends.

39. In a motor vehicle having a chassis, at least one driven wheel, an internal combustion engine for driving said driven wheel, and an exhaust system for said internal combustion engine, said exhaust system comprising an exhaust pipe for conveying exhaust gases from an exhaust port of said engine to an expansion chamber, and valve means for controlling the communication of said exhaust pipe with said expansion chamber, the improvement comprising means for suspending said valve means from said chassis independently of said exhaust pipe.

40. In a motor vehicle as set forth in claim 39 wherein the engine has multiple exhaust ports and there are provided a plurality of exhaust pipes for conveying the exhaust gases from the engine exhaust ports to the expansion chamber.

41. In a motor vehicle as set forth in claim 39 wherein the motor vehicle comprises a motorcycle and the driven wheel is a rear wheel.

42. In a motor vehicle as set forth in claim 41 wherein the engine has multiple exhaust ports and there are provided a plurality of exhaust pipes for conveying the exhaust gases from the engine exhaust ports to the expansion chamber.

43. In a motor vehicle as set forth in claim 42 wherein the valve comprises a casting having a plurality of branch pipes each communicating with a respective one of the exhaust pipes and communicating with and defining the expansion chamber.

44. In a motor vehicle as set forth in claim 43 wherein the valve member in its opened position does not obstruct any flow area of the exhaust pipes.

45. In a motor vehicle as set forth in claim 44 wherein the valve body has a pair of inserts in opposite sides thereof supporting a shaft to which the valve member is affixed.

46. In a motor vehicle as set forth in claim 45 wherein the branch pipes extend in a generally longitudinal direction relative to the motorcycle and the expansion chamber communicates with a tailpipe lying on one side of the rear wheel, said expansion chamber being disposed at an angle to the longitudinal axis and to a horizontal plane for minimizing the obstructions of flow through the exhaust pipe and the control valve.

47. In a motor vehicle as set forth in claim 46 further including means for defining a cooling jacket around at least a portion of the control valve, a forwardly facing air inlet to said cooling jacket and a rearwardly facing discharge therefrom.

48. In a motor vehicle as set forth in claim 47 wherein one of the openings faces downwardly for permitting water to drain from the cooling jacket.

49. In a motor vehicle as set forth in claim 40 wherein the valve comprises a casting having a pluraltiy of branch pipes each communicating with a respective one of the exhaust pipes and communicating with and defining the expansion chamber.

50. In a motor vehicle as set forth in claim 49 wherein the valve body has a pair of inserts in opposite sides thereof supporting a shaft to which the valve member is affixed.

51. In a motor vehicle as set forth in claim 50 further including means for defining a cooling jacket around at least a portion of the control valve, a forwardly facing air inlet to said cooling jacket and a rearwardly facing discharge therefrom.

52. In a motor vehicle having a chassis, at least one driven wheel, an internal combustion engine for driving said driven wheel, and an exhaust system for said internal combustion engine, said exhaust system comprising an exhaust pipe for conveying exhaust gases from an exhaust port of said engine to an expansion chamber, and valve means for controlling the communication of said exhaust pipe with said expansion chamber, the improvement comprising means for providing a cooling jacket around at least a portion of said valve means, a forwardly facing air inlet to said cooling jacket and a rearwardly facing discharge therefrom.

53. In a motor vehicle as set forth in claim 52 wherein one of the openings faces downwardly for permitting water to drain from the cooling jacket.

54. In a motor vehicle as set forth in claim 52 wherein there is provided a shaft for controlling the valve means and the cooling jacket encircles said shaft.

55. A motorcycle having a chassis, a driven rear wheel supported at one end of said chassis, a dirigible front wheel supported at the other end of said chassis, an internal combustion engine for driving said driven wheel, and an exhaust system for said internal combustion engine, said exhaust system comprising exhaust pipe means extending downwardly from said engine and rearwardly and terminating solely at one side of said chassis, an expansion chamber positioned beneath said engine and receiving gases from said exhaust pipe means, and a single tailpipe extending from said expansion chamber to the atmosphere at the other side of said chassis, said expansion chamber being angularly disposed relative to the longitudinal center line of said vehicle for permitting smooth flow of the exhaust gases therethrough.

56. A motorcycle as set forth in claim 55 wherein the expansion chamber is inclined to a horizontal plane and extends upwardly from the exhaust pipe outlet to the tailpipe inlet.

57. A motorcycle as set forth in claim 56 further including control valve means in said expansion chamber for controlling the communication of said exhaust pipe means with said expansion chamber.

58. A motorcycle having a chassis as set forth in claim 55 wherein the exhaust pipe means comprises a plurality of pipes, all of said pipes extending downwardly and rearwardly and terminating at the one side of the chassis and communicating with the expansion chamber.

59. A motorcycle having a chassis, a driven rear wheel supported at one end of said chassis, a dirigible front wheel supported at the other end of said chassis, an internal combustion engine for driving said driven wheel, and an exhaust system for said internal combustion engine, said exhaust system comprising an exhaust pipe extending downwardly from said engine and rearwardly at one side of said chassis, an expansion chamber positioned beneath said engine and receiving gases from said exhaust pipe, a tailpipe extending at the other side of side of said chassis from said expansion chamber to the atmosphere, said expansion chamber being angularly disposed relative to the longitudinal center line of said vehicle for permitting smooth flow of the exhaust gases therethrough and control valve means in said expansion chamber for controlling the communication of said exhaust pipe with said expansion chamber.

60. A motorcycle as set forth in claim 59 wherein the expansion chamber is inclined to a horizontal plane and extends upwardly from the exhaust pipe outlet to the tailpipe inlet.

* * * * *

UNITED STATES PATENT AND TRADEMARK OFFICE
CERTIFICATE OF CORRECTION

PATENT NO. : 4,896,504
DATED : January 30, 1990
INVENTOR(S) : Sachio Matsui

It is certified that error appears in the above-identified patent and that said Letters Patent is hereby corrected as shown below:

ON THE TITLE PAGE, under "Assignee" "Matsudoki" should be --Hatsudoki--.

ON THE TITLE PAGE, under "U.S. References Cited", reference "4,327,811", "9/82" should be --5/82--.

Column 11, line 7, Claim 11, "pipes" should be --pipe--.

Column 11, line 40, Claim 21, "21" should be --19--.

Column 11, line 51, Claim 25, "systetm" should be --system--.

Column 12, line 1, Claim 31, after "combustion" insert --engine--.

Column 13, line 24, Claim 49, "pluraltiy" should be --plurality--.

Column 14, line 43, Claim 59, delete "side of".

Column 14, line 48, Claim 59, "controing" should be --controlling--.

Signed and Sealed this

Twenty-fifth Day of August, 1992

Attest:

DOUGLAS B. COMER

*Attesting Officer*     *Acting Commissioner of Patents and Trademarks*